US008825836B1

(12) United States Patent
Gibson et al.

(10) Patent No.: US 8,825,836 B1
(45) Date of Patent: Sep. 2, 2014

(54) SYSTEMS AND METHODS FOR MANAGING NOTIFICATION MESSAGES GENERATED BY ONE OR MORE APPLICATIONS

(75) Inventors: Douglas Gibson, Newton, MA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 440 days.

(21) Appl. No.: 12/689,028

(22) Filed: Jan. 18, 2010

(51) Int. Cl.
*G06F 15/173* (2006.01)

(52) U.S. Cl.
USPC ......................... 709/224; 709/223; 455/412.2

(58) Field of Classification Search
USPC ................................ 709/224, 223; 455/412.2
See application file for complete search history.

(56) References Cited

U.S. PATENT DOCUMENTS 7,099,938 B2 * 8/2006 Hermann et al. ............. 709/224
7,568,027 B2 * 7/2009 Becker et al. ................. 709/224
7,886,053 B1 * 2/2011 Newstadt et al. ............. 709/225
8,032,624 B2 * 10/2011 Brunson et al. ............... 709/223
2002/0091944 A1 * 7/2002 Anderson et al. ............. 713/201
2007/0011231 A1 * 1/2007 Manion et al. ................ 709/204
2007/0233842 A1 * 10/2007 Roberts et al. ................ 709/223
2009/0240767 A1 * 9/2009 Zhang ........................... 709/203
2009/0318110 A1 * 12/2009 Zarefoss .................... 455/404.2
2009/0327482 A1 * 12/2009 Malhotra et al. .............. 709/224
2010/0088692 A1 * 4/2010 Rathi et al. .................... 717/171
2010/0169472 A1 * 7/2010 Okamoto et al. ............. 709/224
2013/0040610 A1 * 2/2013 Migicovsky et al. ...... 455/412.2

* cited by examiner

*Primary Examiner* — Michael C Lai
(74) *Attorney, Agent, or Firm* — Holland & Hart LLP

(57) ABSTRACT

A computer-implemented method for managing notification messages generated by one or more applications is described. A policy is configured to control notification messages scheduled to be shown on a display. One or more events associated with the creation of a message are monitored. A determination is made as to whether the created message is a notification message. The configured policy is applied if the created message is a notification message.

19 Claims, 8 Drawing Sheets

SYSTEMS AND METHODS FOR MANAGING NOTIFICATION MESSAGES GENERATED BY ONE OR MORE APPLICATIONS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Users of computer technologies continue to demand that the efficiency of these technologies increase. These demands include demands to improve the functionality of computing devices. For example, applications installed on computing devices may require updates in order to function properly. These updates may be downloaded or installed on the computing device.

In some instances, a message may be provided to a user indicating that a certain update is available for an application. In addition, messages relating to updates for an operating system (OS) of a computing device may also be provided to a user. These messages may appear on a screen or other type of display of the computing device. A user may become distracted with the appearance of these messages. In addition, the user may not be aware of the actions to take when a particular message is displayed or provided to the user. As a result, benefits may be realized by providing systems and methods for managing notification messages generated by one or more applications.

SUMMARY

According to at least one embodiment, a computer-implemented method for managing notification messages generated by one or more applications is described. A policy is configured to control notification messages scheduled to be shown on a display. One or more events associated with the creation of a message are monitored. A determination is made as to whether the created message is a notification message. The configured policy is applied if the created message is a notification message.

In one configuration, the created message is determined to be a notification message based on the location of the message on the display. The configured policy may include instructions to prevent commands to generate a window to display the notification message from being processed. In addition, the configured policy may include instructions to write the notification message to a log file.

In one example, the configured policy may include instructions to allow the notification message to be displayed. Further, the configured policy may include instructions to transmit the notification message via an email message. The configured policy may also include instructions to transmit the notification message via a short messaging service (SMS). The configured policy may further include instructions to transmit the notification message via an instant messaging (IM) service. In one embodiment, the configured policy may include instructions to close a window displaying the notification message.

A computer system configured to manage notification messages generated by one or more applications is also described. The computer system may include a processor and memory in electronic communication with the processor. The computer system may also include a message management module configured to configure a policy to control notification messages scheduled to be shown on a display, and monitor one or more events associated with the creation of a message. The module may also be configured to determine if the created message is a notification message, and apply the configured policy if the created message is a notification message.

A computer-program product for managing notification messages generated by one or more applications is also described. The computer-program product may include a computer-readable medium having instructions thereon. The instructions may include code programmed to configure a policy to control notification messages scheduled to be shown on a display, and code programmed to monitor one or more events associated with the creation of a message. The instructions may also include code programmed to determine if the created message is a notification message, and code programmed to apply the configured policy if the created message is a notification message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
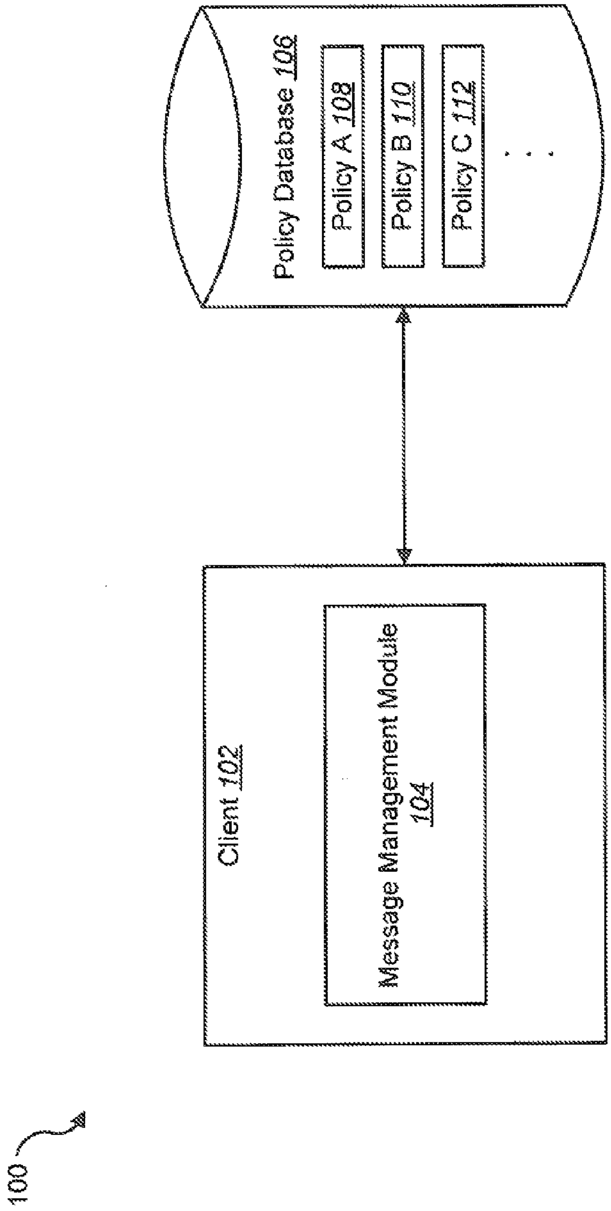
FIG. 1 is a block diagram illustrating one embodiment of a message management module implemented on a client computing device.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many software applications display toast messages. Toast messages may be notification messages regarding a certain application. For example, a toast message for an application may indicate that a software update for the application is available to download.

In one embodiment, toast messages may be displayed in a small window on a computer screen. The message may be displayed in a common area of the screen where notification (or toast) messages from other applications may also be seen. For example, the messages may appear in the lower right-hand corner of the screen, commonly referred to as the "notification area".

Windows that include toast messages may appear automatically. In addition, these windows may disappear by themselves or require the user to dismiss them. As the number of applications using toast messages to notify a user increases, the user may become easily distracted and overburdened by toast messages. Even if interaction from the user is not required to dismiss a toast message, the appearance and disappearance of these messages may annoy the user, interrupt his/her train of thought, or disrupt the task at hand. In addition, users may become conditioned to ignore toast messages, and as a result, not respond to important messages that pertain to the security of their computer. For example, notification messages regarding important security updates for an application may be provided to the user as a toast message. The user, however, may be conditioned to ignore toast messages. As a result, the application may not be updated with the latest security update.

In the case of operating systems and/or security related messages, the messages may not be displayed to the appropriate user. For example, in a network environment, certain toast messages relating to the security of applications installed on client devices may be intended for a network administrator. Toast messages may be displayed on a client computing device to the user that is currently operating the client computing device. Unless the network administrator is operating the client device (or the user relays the toast message), the network administrator may not be aware of the toast message for an application.

While individual applications may allow toast messages to be disabled, the configuration option may be difficult for a user to locate. When this configuration is available, it is generally an on-or-off setting that does not provide granular control. Moreover, there is no existing mechanism to allow users to control the display of toast messages from multiple applications.

The present systems and methods provide a mechanism for automated, policy based control of computer user interface notification messages. These messages may be small messages displayed by software applications or operating systems, commonly, but not exclusively, in the lower right portion of a display screen in a notification area. The present systems and methods may provide users control to regulate when, and if, notification messages are displayed. This control may relieve users of the distractions caused by notification messages from multiple applications.

In one example, a user may define a notification message management policy to control which messages are displayed, which messages are blocked, whether a message should be logged for later review, and whether a different notification method (e.g., e-mail, short messaging services (SMS), etc.) should be used for the message.

FIG. 1 is a block diagram illustrating one embodiment of a message management module 104 implemented on a client computing device 102. In one configuration, the client 102 may be a personal computer (PC), a laptop, a personal digital assistant (PDA), a wireless communications device, and the like. In one example, the message management module 104 may provide a user interface to a user of the client 102. The user may create and/or configure one or more policies relating to notification messages for applications installed on the client 102.

In one embodiment, a policy database 106 may store various policies created and configured by the user through the message management module 104. For example, the policy database 106 may include policy A 108, policy B 110, and policy C 112. Each policy 108, 110, 112 may be associated with a different application implemented by the client 102. For example, the user may create and/or configure policy A 108 that is associated with application A. In one embodiment, policy A 108 may be configured by the user via the message management module 104. Similarly, policy B 110 may be associated with application B and the user may create and/or configure policy B 110 via the message management module 104. Each policy 108, 110, 112 may define how notification messages from their respective applications are treated. For example, the policies 108, 110, 112 may indicate whether a notification message should be displayed, suppressed, forwarded to a computing device that is different from the client 102, and the like.

Figure 2:
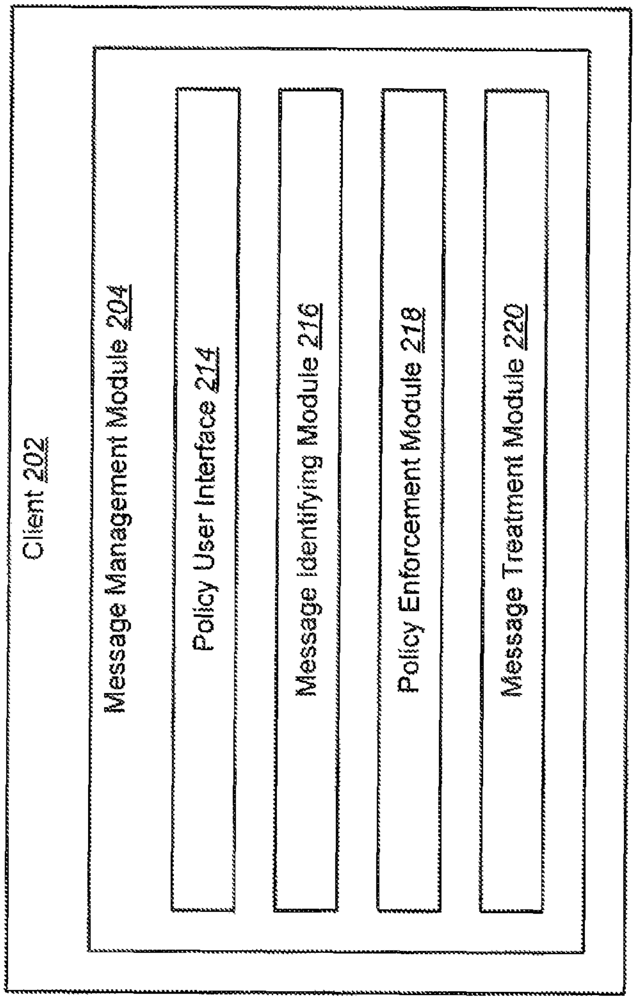
FIG. 2 is a block diagram illustrating a further embodiment of a message management module.

FIG. 2 is a block diagram illustrating a further embodiment of a message management module 204 implemented on a client computing device 202. In one embodiment, the message management module 204 may include a policy user interface 214. The user interface 214 may provide an interface for a user to create and/or configure a policy to control the automated treatment of notification messages generated by an application installed on the client 202. The policy may manage the notification messages based on the executable application displaying the messages, the contents of the messages (e.g., regex matching), the user logged into the client computing device 102, and the like.

The management module 204 may also include a message identifying module 216. In one configuration, the identifying module 216 may analyze messages generated by applications installed on the client 202. As part of the analysis, the message identifying module 216 may identify particular types of messages created by these applications. For example, the message identifying module 216 may identify messages that are notification messages generated by the various applications. In particular, the identifying module 216 may identify toast messages created by applications installed on the client 202. In addition, the identifying module 216 may extract the text of the message from the window displaying the message. The module 216 may extract the text via optical character recognition (OCR).

In one configuration, a policy enforcement module 218 may enforce policies that describe how notification messages from applications are to be controlled. For example, when the message identifying module 216 determines that a message generated by an application is a notification message (or a toast message), the policy enforcement module 218 may enforce the policy associated with that type of message and application. A message treatment module 220 may execute the treatment of these messages according to the policy associated with these messages. For example, the treatment module 220 may display the messages, suppress the messages, forward the messages to a client computing device that is different from the client 202, etc. The treatment module 220 may execute the treatment of these messages in accordance with the policies created and/or configured for the messages.

Figure 3:
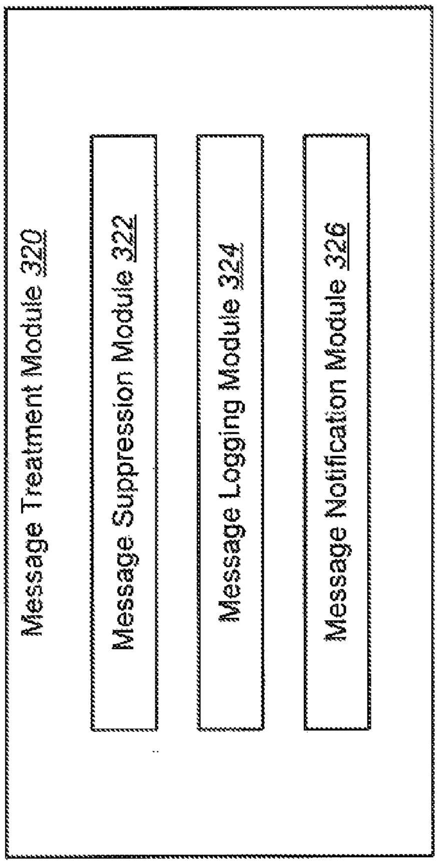
FIG. 3 is a block diagram illustrating a further embodiment of a message treatment module.

FIG. 3 is a block diagram illustrating a further embodiment of a message treatment module 320. The treatment module 320 may execute certain functions relating to the treatment of a notification message generated by an application. The functions may be executed in accordance with a policy associated with the notification message and the application that generated the message. In one example, the message treatment module 320 may include a message suppression module 322. In one configuration, the policy associated with the notification message and the application that generated the message may indicate that the notification message is to be suppressed and not displayed. The suppression module 322 may then suppress or prevent notification messages generated by the application. In one example, the suppression module 322 may suppress the notification message by closing windows used to display the message, hiding the window, moving on the window off screen, and the like.

The treatment module 320 may also include a message logging module 324. The logging module 324 may log the notification message if the policy associated with the message indicates that such messages are to be logged. The logging module 324 may write identified notification messages to a logged file where a user may retrieve and review these notification messages at a later time. The treatment module 320 may further include a message notification module 326. In one embodiment, a policy may indicate that notification messages associated with a particular application are to be transmitted to a certain location. For example, the application may be installed on a first client in a network environment that includes multiple client computing devices. The policy may indicate that notification messages scheduled to be displayed on the first client should be transmitted to a second client computing device. In one embodiment, the message may be displayed on the second device which is being operated by a network administrator. The notification module 326 may send the notification message to a different device via mechanisms such as e-mail, short message services (SMS), instant messaging (IM), and the like. This may allow notification messages, such as security notifications and operating system update notifications, to be communicated to an appropriate user (such as the network administrator) instead of the user currently using or logged in to the first client computing device.

Figure 4:
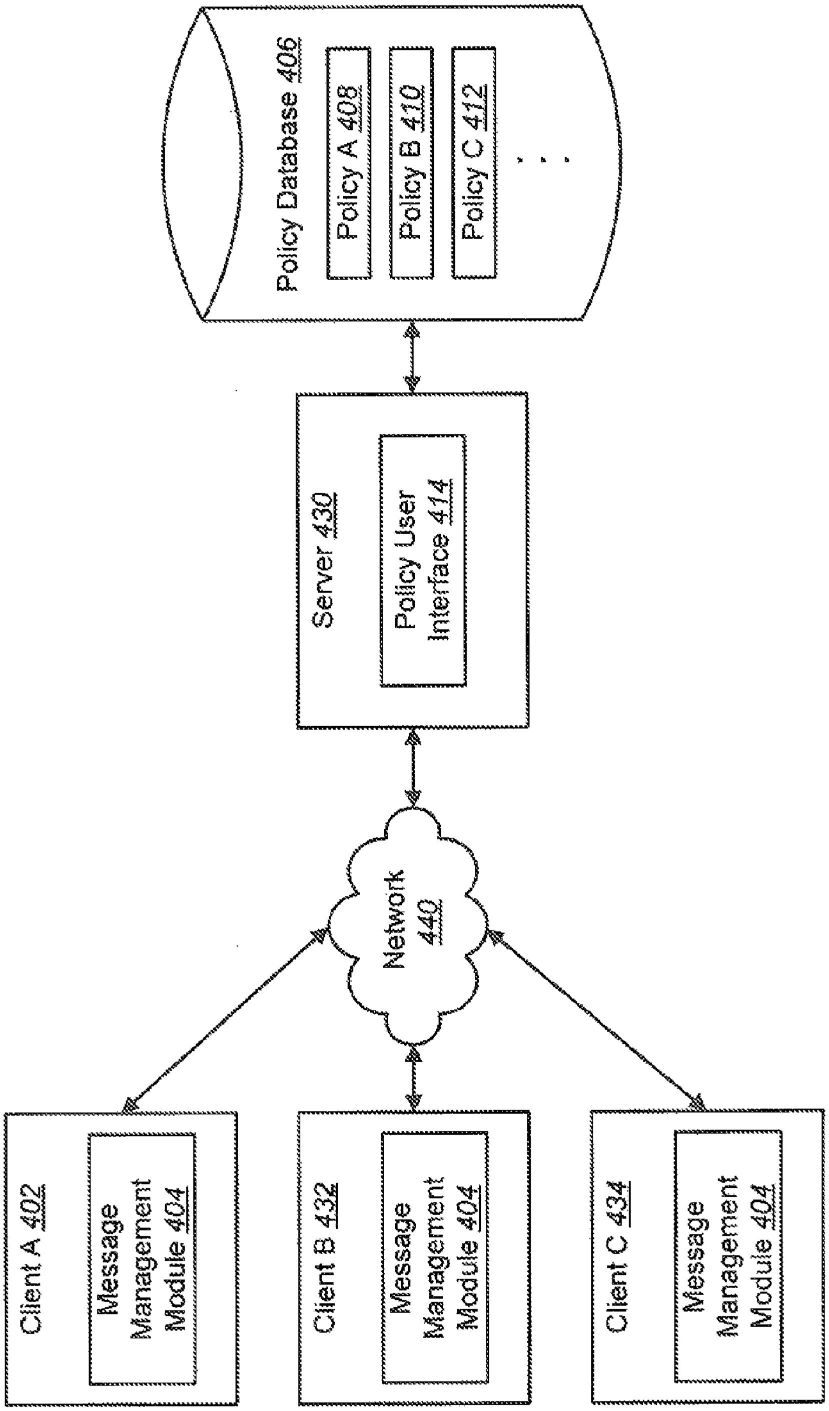
FIG. 4 is a block diagram illustrating one embodiment of client server environment in which the present systems and methods may be implemented.

FIG. 4 is a block diagram illustrating one embodiment of client server environment 400 in which the present systems and methods may be implemented. In one configuration, a plurality of clients 402, 432, 434 may communicate with a server 430 across a network connection 440. The server 430 may include a policy user interface 414. A user may interact with the user interface 414 on the server 430 to create and/or configure various policies 408, 410, 412. The policies 408, 410, 412 may be stored in a policy database 406. The various policies 408, 410, 412 may indicate how notification messages generated by various applications installed on the clients 402, 432, 434 are to be treated or handled. The server 430 may push the various policies 408, 410, 412 to one or more clients 402, 432, 434 across the network connection 440. Each client 402, 432, 434 may include a message management module 404. The message management module 404 may identify notification messages created by the applications and enforce the policies 408, 410, 412 associated with the notification messages and the applications that generate the messages.

Figure 5:
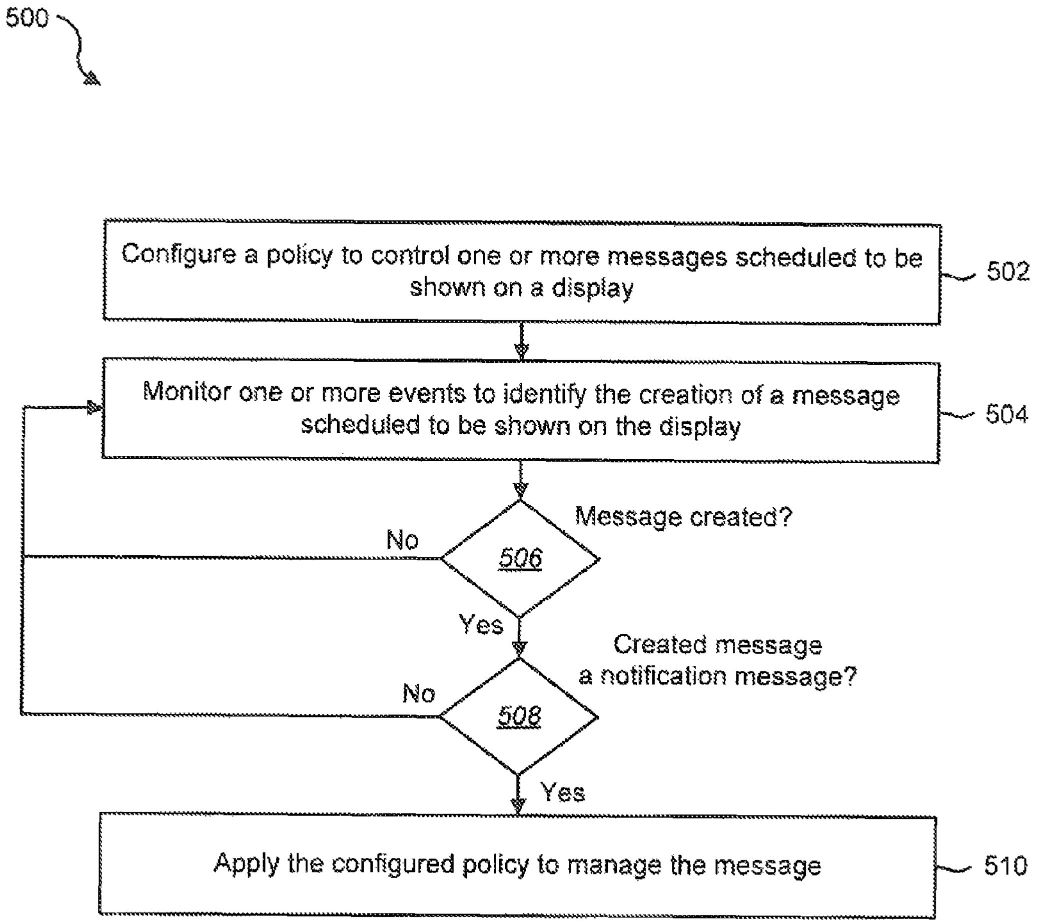
FIG. 5 is a flow diagram illustrating one embodiment of a method for managing notification messages generated by applications running on a client computing device.

FIG. 5 is a flow diagram illustrating one embodiment of a method 500 for managing notification messages generated by applications installed on a client computing device. In one embodiment, the method 500 may be implemented by the message management module 104.

In one example, a policy to control one or more messages scheduled to be shown on a display may be configured 502. The messages may be notification messages, such as toast messages. One or more events may be monitored 504 in order to identify when a message scheduled to be shown on the display is created. For example, the message management module 104 may monitor events to determine when messages are created by applications installed on the client computing device 102. A determination 506 may be made as to whether a message has been created. If it is determined 506 that no message has been created, the method 500 may return to continue monitoring 504 for events in order to identify the creation of a message scheduled to be shown on the display of the computing device 102. If, however, it is determined 506, that a message has been created, a determination 508 may be made as to whether the created message is a notification message (or a toast message). The determination 508 may be made based on the location of the message on the display (e.g., distance from a system tray in a Windows OS Desktop display), size of the window housing the message, and the like.

If it is determined 508 that the created message is not a notification message, the method 500 may return to monitor 504 one or more events to identify the creation of another message. If, however, it is determined 508 that the created message is a notification message, the configured policy may be applied 510 to the notification message in order to manage the message. In one example, commands to display the message may be intercepted before they are processed so that the notification message is suppressed or prevented from being displayed. In addition, the configured policy may indicate that the message is to be forwarded to a separate computing device. This may be accomplished by emailing the message, sending the message using SMS or IM, and the like. This may allow notification messages, such as security notifications and operating system update notifications, to be communicated to a user that may be more appropriate than the user currently logged in the client computing device 102.

Figure 6:
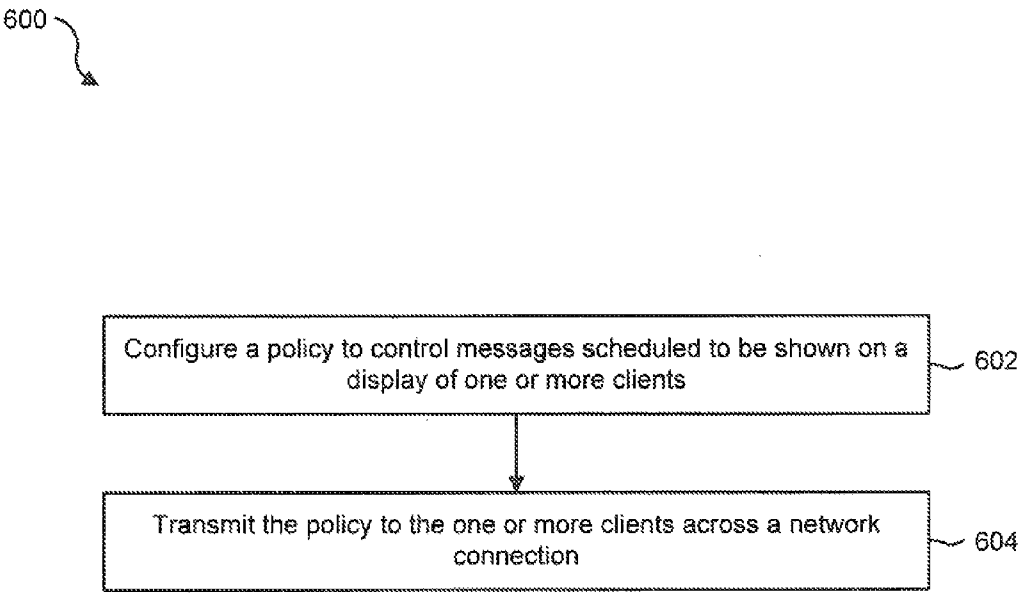
FIG. 6 is a flow diagram illustrating one embodiment of a method for generating or configuring policies to manage notification messages.

FIG. 6 is a flow diagram illustrating one embodiment of a method 600 for generating and/or configuring policies to manage notification messages. In one embodiment, the method 600 may be implemented by the policy user interface 414 which may be installed on a server device 430.

In one example, a policy to control messages scheduled to be shown on a display of one or more clients may be configured 602. The policy may be transmitted 604 to the one or more clients across a network connection. As previously explained, the configured policies may be stored within a policy database and accessed by the server 530.

Figure 7:
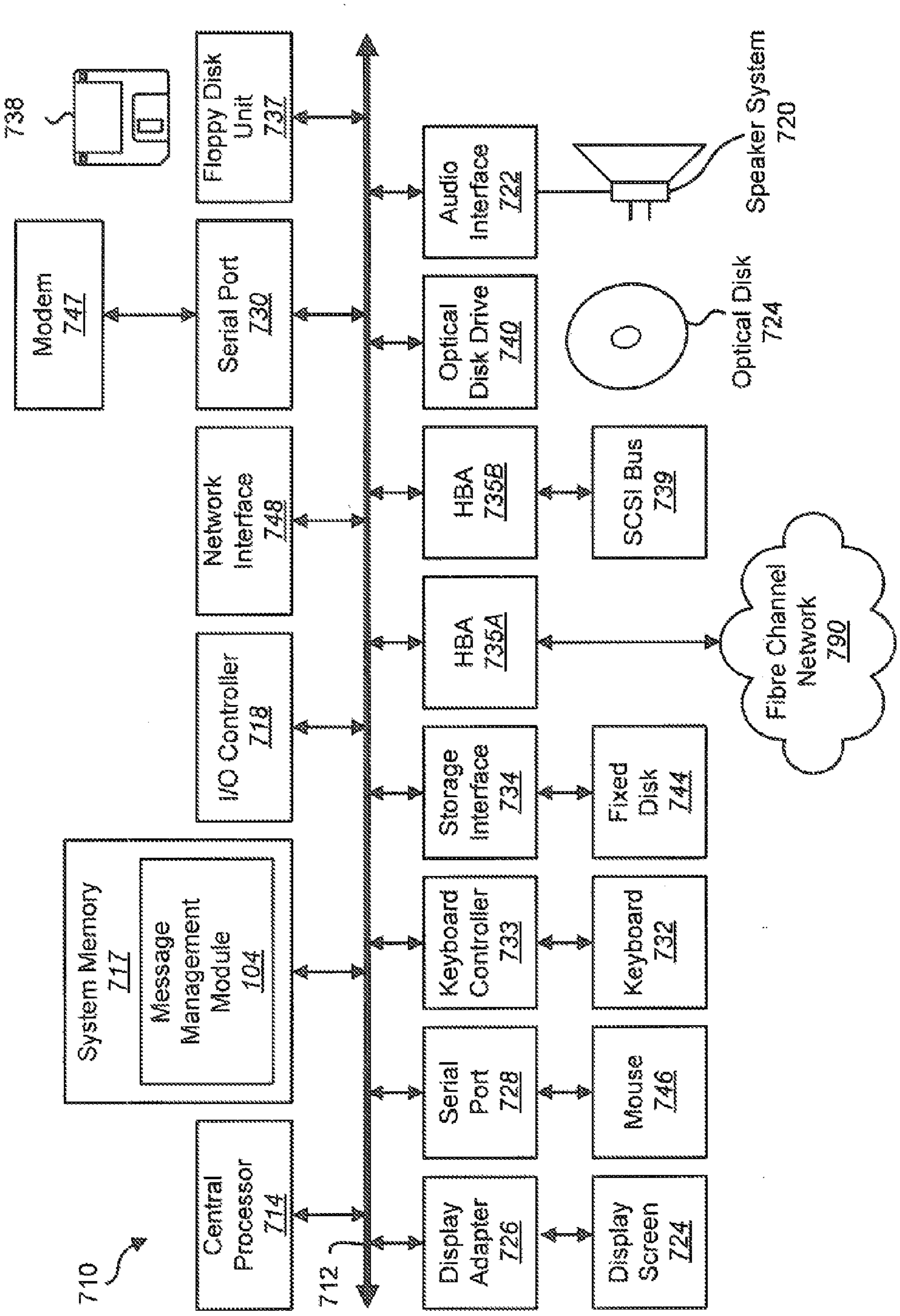
FIG. 7 depicts a block diagram of a computer system suitable for implementing the present systems and methods.

FIG. 7 depicts a block diagram of a computer system 710 suitable for implementing the present systems and methods. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. For example, the application 104 to implement the present systems and methods may be stored within the system memory 717. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
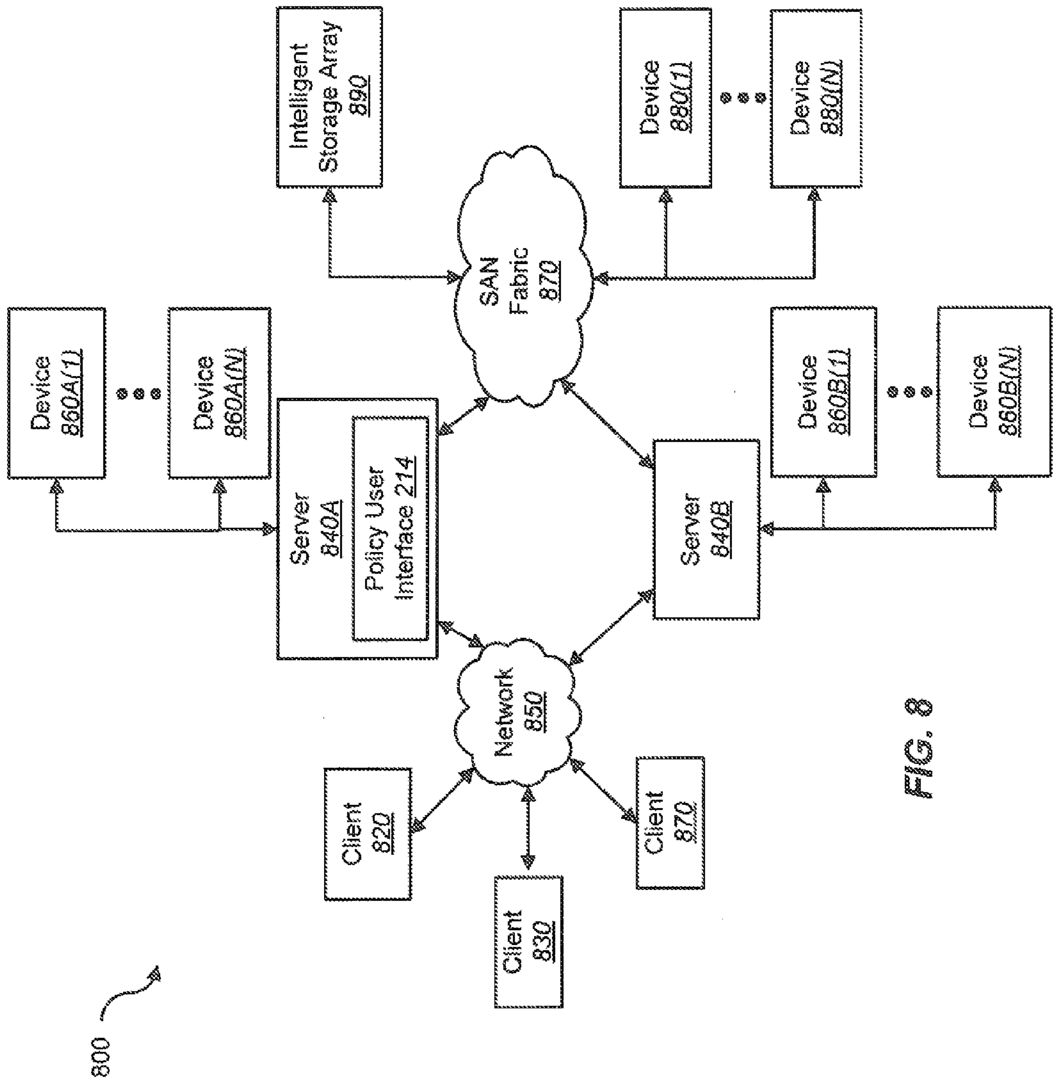
FIG. 8 is a block diagram depicting a network architecture in which client systems, as well as storage servers (any of which can be implemented using computer system), are coupled to a network.

FIG. 8 is a block diagram depicting a network architecture 800 in which client systems 810, 820 and 830, as well as storage servers 840A and 840B (any of which can be implemented using computer system 810), are coupled to a network 850. In one embodiment, the application 104 may be located within a server 840A, 840B to implement the present systems and methods. The storage server 840A is further depicted as having storage devices 860A(1)-(N) directly attached, and storage server 840B is depicted with storage devices 860B(1)-(N) directly attached. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of" In addition, for ease of use, the words "including" and "having," as used in the specification and claims, are interchangeable with and have the same meaning as the word "comprising."

What is claimed is:

1. A computer-implemented method for managing notification messages generated by one or more applications, comprising:
- detecting, by a processor of a client device, an application on the client device generating a message, the message being scheduled to be displayed on the client device;
- upon detecting the application generating the message, implementing, by the processor, a policy to control notification messages on the client device, the policy being configured by a network administrator of the client device;
- determining, by the processor, if the message generated by the application is a notification message; and
- applying, by the processor, the configured policy if the message generated by the application is a notification message, comprising:
  - determining, by the processor, whether the message includes a security notification or an operating system update notification;
  - blocking, by the processor, the message generated by the application from being displayed on the client device upon determining the message includes a security notification or an operating system update notification; and
  - forwarding, by the processor, the message generated by the application to a computing device operated by the network administrator upon determining the message includes a security notification or an operating system update notification.

2. The method of claim 1, wherein the message is determined to be a notification message based on a location on a display of the client device associated with the message.

3. The method of claim 1, wherein if the message is a notification message the configured policy comprises instructions to write the message to a log file based on whether the message includes a security notification or an operating system update notification.

4. The method of claim 1, wherein if the message is a notification message the configured policy comprises instructions to allow the message to be displayed on the client device upon determining the message does not include a security notification or an operating system update notification.

5. The method of claim 1, wherein if the message is a notification message the configured policy comprises instructions to transmit the message via an email message based on whether the message includes a security notification or an operating system update notification.

6. The method of claim 1, wherein if the message is a notification message the configured policy comprises instructions to transmit the message via a short messaging service (SMS) based on whether the message includes a security notification or an operating system update notification.

7. The method of claim 1, wherein if the message is a notification message the configured policy comprises instructions to transmit the message via an instant messaging (IM) service based on whether the message includes a security notification or an operating system update notification.

8. The method of claim 1, wherein if the message is a notification message the configured policy comprises instructions to close a window displaying the message based on whether the message includes a security notification or an operating system update notification.

9. The method of claim 1, wherein the configured policy comprises instructions to prevent commands to generate a window to display the message from being processed.

10. A computer system configured to manage notification messages generated by one or more applications, comprising:
- a processor;
- memory in electronic communication with the processor; and
- instructions stored in the memory, the instructions being executable by the processor to:
  - detect an application on the client device generating a message, the message being scheduled to be displayed on the client device;
  - upon detecting the application generating the message, implement a policy to control notification messages on the client device, the policy being configured by a network administrator of the client device;
  - determine if the message generated by the application is a notification message; and
  - apply the configured policy if the message generated by the application is a notification message, comprising:
    - determine whether the message includes a security notification or an operating system update notification;
    - block the message generated by the application from being displayed on the client device upon determining the message includes a security notification or an operating system update notification; and
    - forward the message generated by the application to a computing device operated by the network administrator upon determining the message includes a security notification or an operating system update notification.

11. The computer system of claim 10, wherein the message is determined to be a notification message based on a location on a display of the client device associated with the message.

12. The computer system of claim 10, wherein if the message is a notification message the configured policy comprises instructions to write the message to a log file based on whether the message includes a security notification or an operating system update notification.

13. The computer system of claim 10, wherein if the message is a notification message the configured policy comprises instructions to allow the message to be displayed on the client device upon determining the message does not include a security notification or an operating system update notification.

14. The computer system of claim 10, wherein if the message is a notification message the configured policy comprises instructions to transmit the message via an email message based on whether the message includes a security notification or an operating system update notification.

15. The computer system of claim 10, wherein if the message is a notification message the configured policy comprises instructions to transmit the message via a short messaging service (SMS) based on whether the message includes a security notification or an operating system update notification.

16. The computer system of claim 10, wherein if the message is a notification message the configured policy comprises instructions to transmit the message via an instant messaging (IM) service based on whether the message includes a security notification or an operating system update notification.

17. The computer system of claim 10, wherein if the message is a notification message the configured policy comprises instructions to close a window displaying the message based on whether the message includes a security notification or an operating system update notification.

18. A computer-program product for managing notification messages generated by one or more applications, the computer-program product comprising a non-transitory computer-readable medium having instructions thereon, the instructions being executable by a processor to:

detect an application on the client device generating a message, the message being scheduled to be displayed on the client device;

implement a policy to control notification messages on the client device, the policy being configured by a network administrator of the client device;

determine if the message generated by the application is a notification message; and apply the configured policy if the message generated by the application is a notification message, comprising:

determine whether the message includes a security notification or an operating system update notification;

block the message generated by the application from being displayed on the client device upon determining the message includes a security notification or an operating system update notification; and forward the message generated by the application to a computing device operated by the network administrator upon determining the message includes a security notification or an operating system update notification.

19. The computer-program product of claim 18, wherein the message is determined to be a notification message based on a location on a display of the client device associated with the message.

* * * * *